United States Patent [19]

Bradt et al.

[11] Patent Number: 4,814,592
[45] Date of Patent: Mar. 21, 1989

[54] APPARATUS AND METHOD FOR STORING AND RETRIEVING ARTICLES

[75] Inventors: L. Jack Bradt; Robert L. Brown; Stephen Fogt, all of Easton, Pa.; Ronald La Roy, Rockaway, N.J.; Allen R. Lewis, Easton, Pa.; James S. Love, Newport News, Va.

[73] Assignee: Videomat Associates, Easton, Pa.

[21] Appl. No.: 868,815

[22] Filed: May 29, 1986

[51] Int. Cl.$^4$ .......................... G06K 5/00; G06F 15/24
[52] U.S. Cl. ..................................... 235/381; 235/383; 235/385; 235/375; 369/34; 364/479
[58] Field of Search ............... 235/375, 376, 377, 380, 235/381, 383, 385, 419; 414/267, 273, 268; 340/825.35; 364/401–403, 410, 478, 479; 369/14, 33, 34, 37; 360/137, 91, 92, 132; 221/81, 88, 2, 5; 186/56

[56] References Cited

U.S. PATENT DOCUMENTS

| | | | |
|---|---|---|---|
| 4,300,040 | 11/1981 | Gould et al. | 235/381 |
| 4,414,467 | 11/1983 | Gould et al. | 235/381 |
| 4,458,802 | 7/1984 | Maciver et al. | 194/4 R |
| 4,519,522 | 5/1985 | McElwee | 221/13 |
| 4,598,810 | 7/1986 | Shore et al. | 194/205 |
| 4,602,299 | 7/1986 | Saito | 360/132 |
| 4,668,150 | 5/1987 | Blumberg | 221/88 |

FOREIGN PATENT DOCUMENTS

| | | | |
|---|---|---|---|
| 1207411 | 7/1986 | Canada | 235/494 |
| 0191636 | 8/1986 | European Pat. Off. | 221/88 |
| 54-66806 | 5/1979 | Japan . | |
| 86-02758 | 5/1986 | PCT Int'l Appl. | 221/88 |

OTHER PUBLICATIONS

Creditron brochure of Credit Vending, Inc., 2949 W. Osborn Rd., Phoenix, AZ 85017.
Video Vendor brochure of Louis Maisano, Jr., 165 East 32nd Street, Mailbox #34, New York, NY 10016.
MovieMart brochure of MovieMart Corporation, 11040 Santa Monica Boulevard, Los Angeles, CA 90025.

Primary Examiner—Alan Faber
Assistant Examiner—Robert A. Weinhardt
Attorney, Agent, or Firm—Lerner, David, Littenberg, Krumholz & Mentlik

[57] ABSTRACT

A machine from which a customer can selectably purchase or rent a videocassette or return a previously rented videocassette. The machine comprises a videocassette storage device for storing a plurality of videocassettes in discrete, identifiable locations. A customer identification device, receives information about the customer. A mode selection device enable the customer to select among a vend mode, a rent mode and a return mode, and a videocassette selection device enable the customer to select a desired videocassette to be vended or rented. A customer access device is provided for dispensing the selected videocassette to the customer in the vend and rent modes and receiving the videocassette from the customer in the return mode. A videocassette identification device receives information representative of the identity of the videocassette being returned in the return mode. A videocassette transport device is provided for transporting the selected videocassette from the storage device to the customer access device in the vend and rent modes and transporting the videocassette from the customer access device to any available empty discrete location in the storage device in the return mode. A memory device stores information about the customer, the selected mode, the selected videocassette, and the coordinates of videocassettes and available empty discrete locations in the storage device.

60 Claims, 11 Drawing Sheets

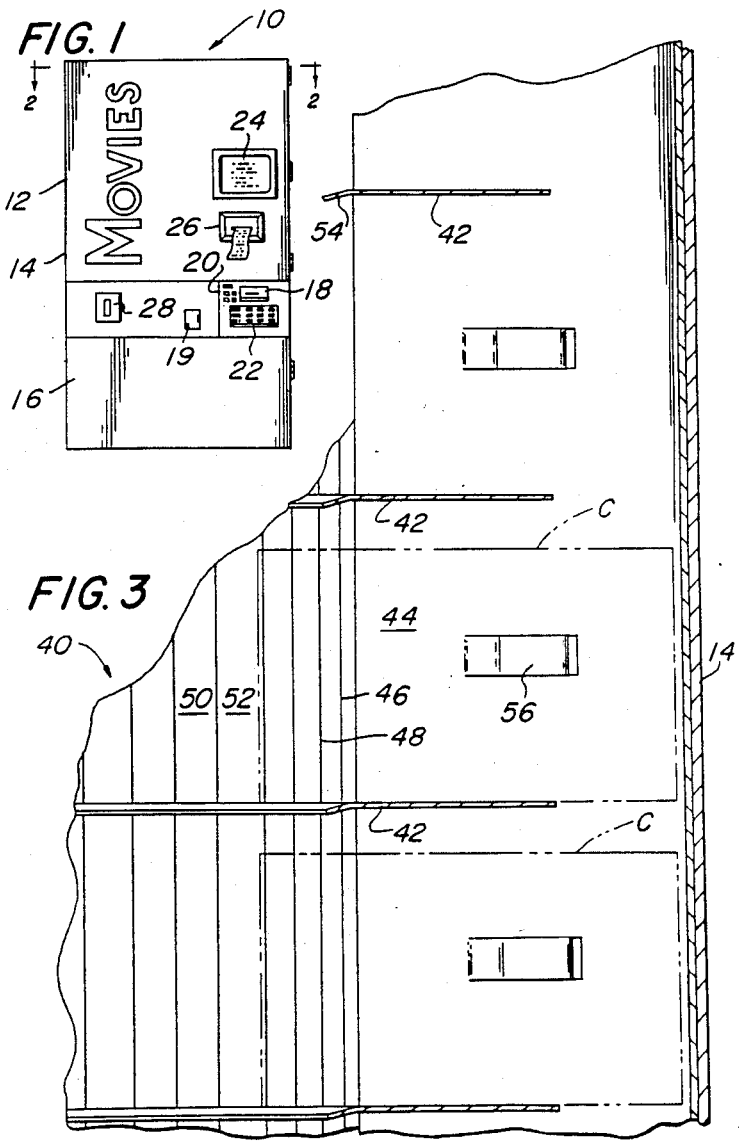

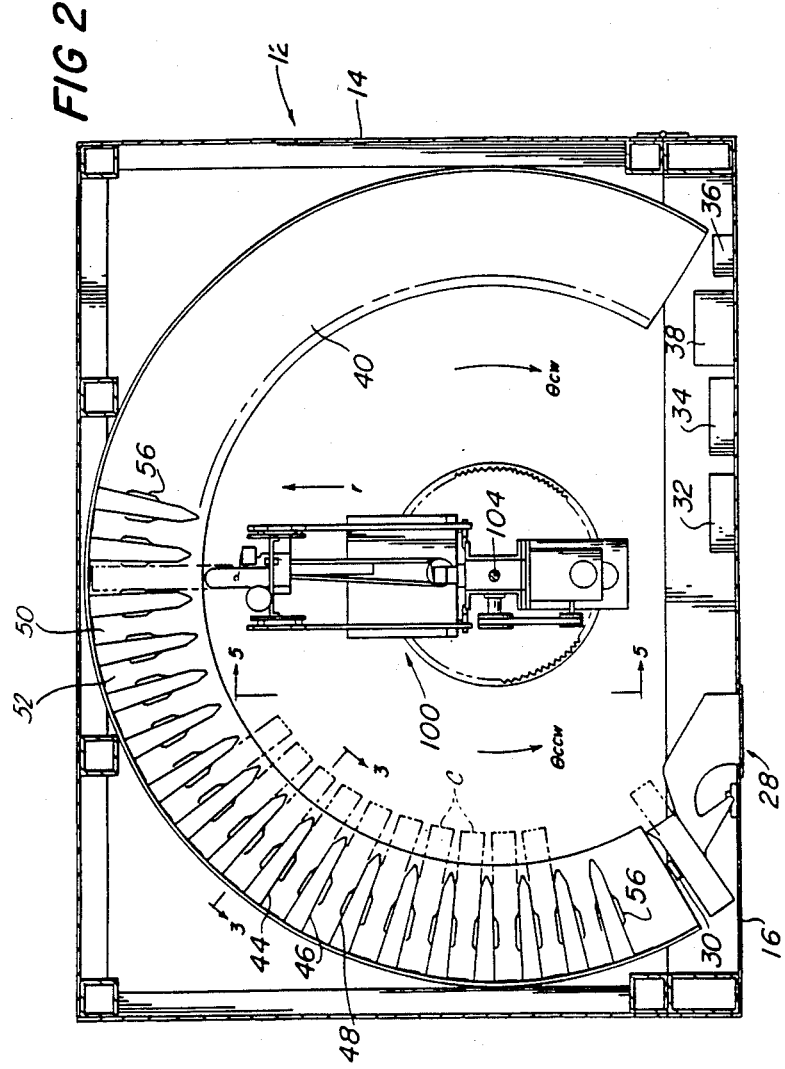

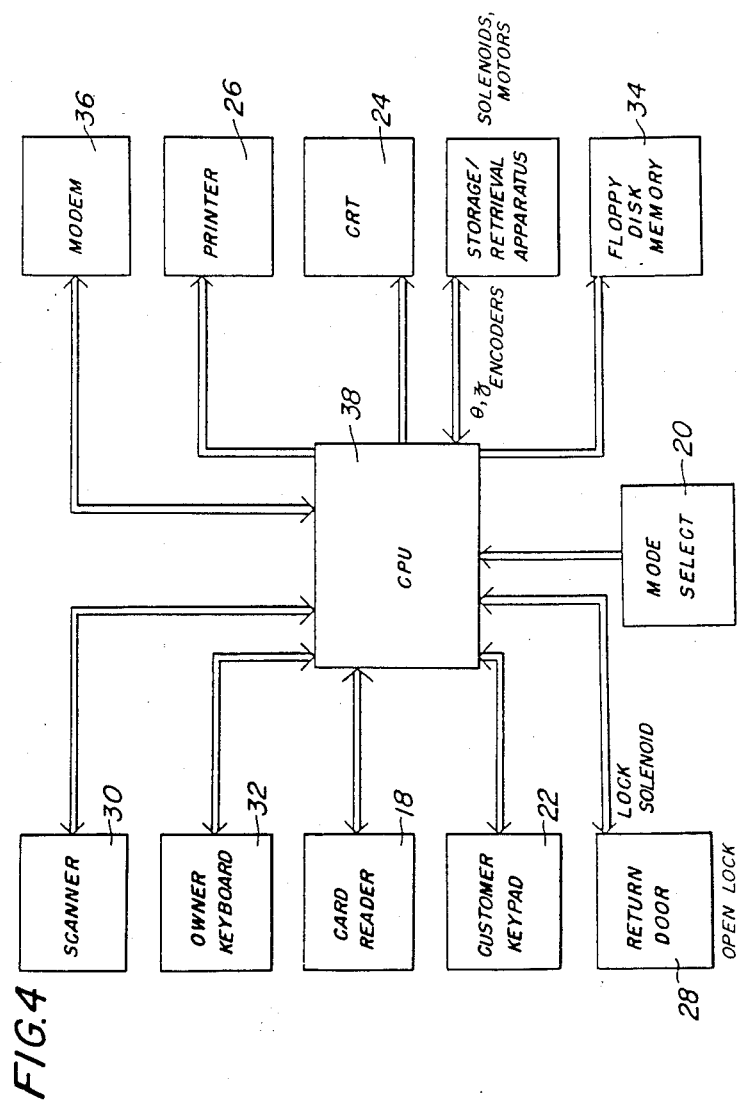

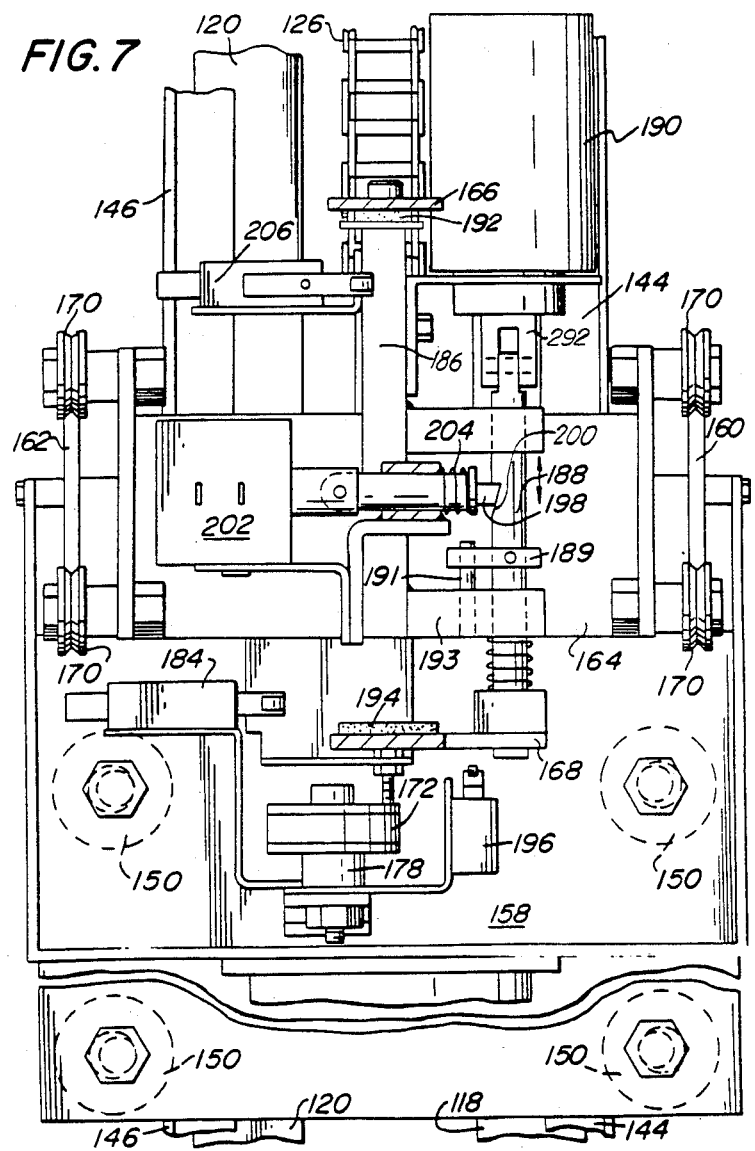

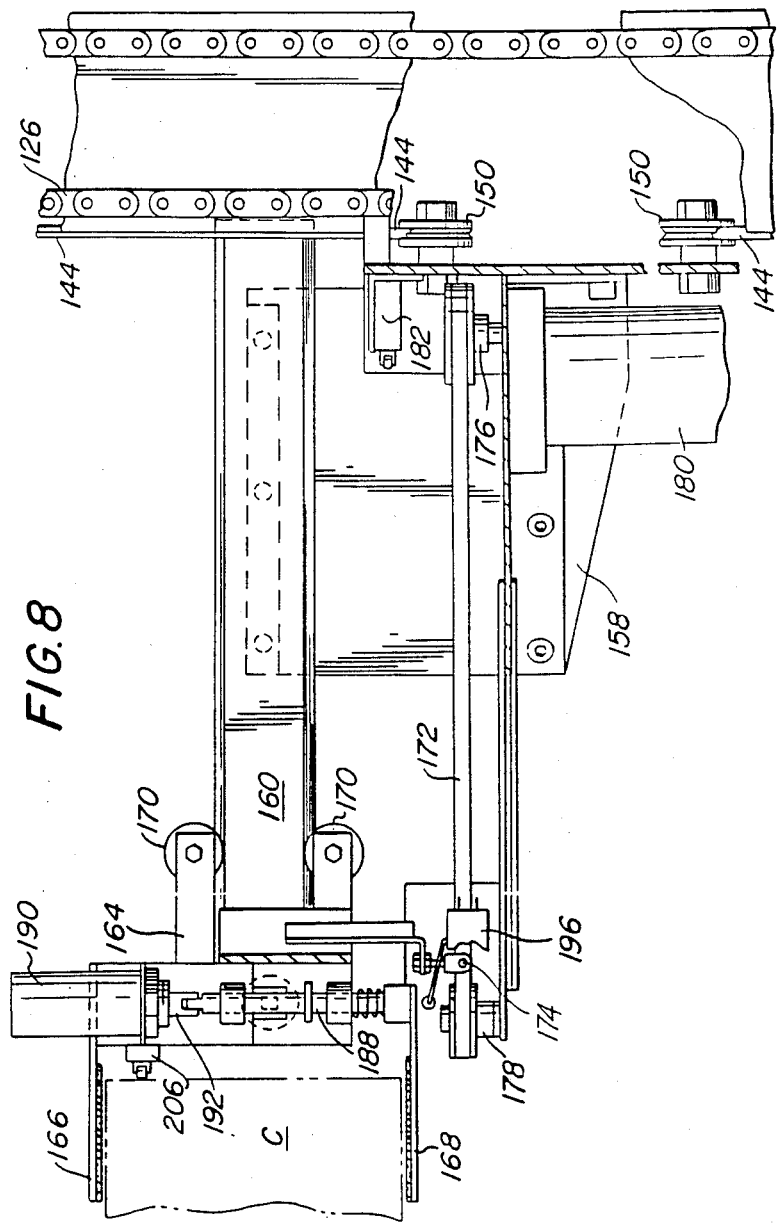

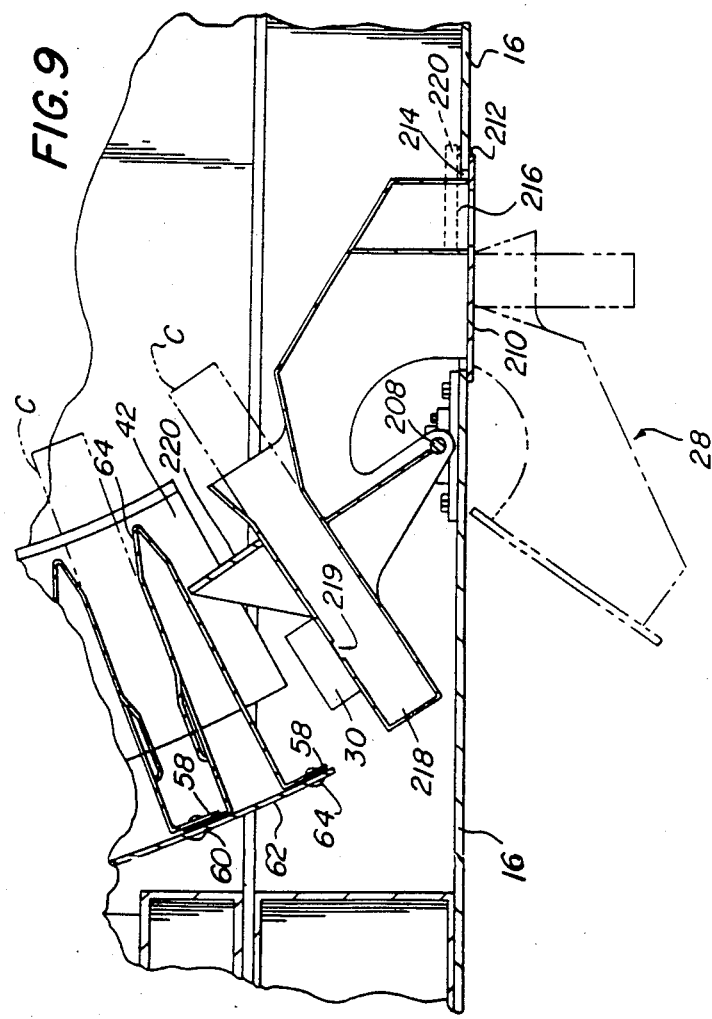

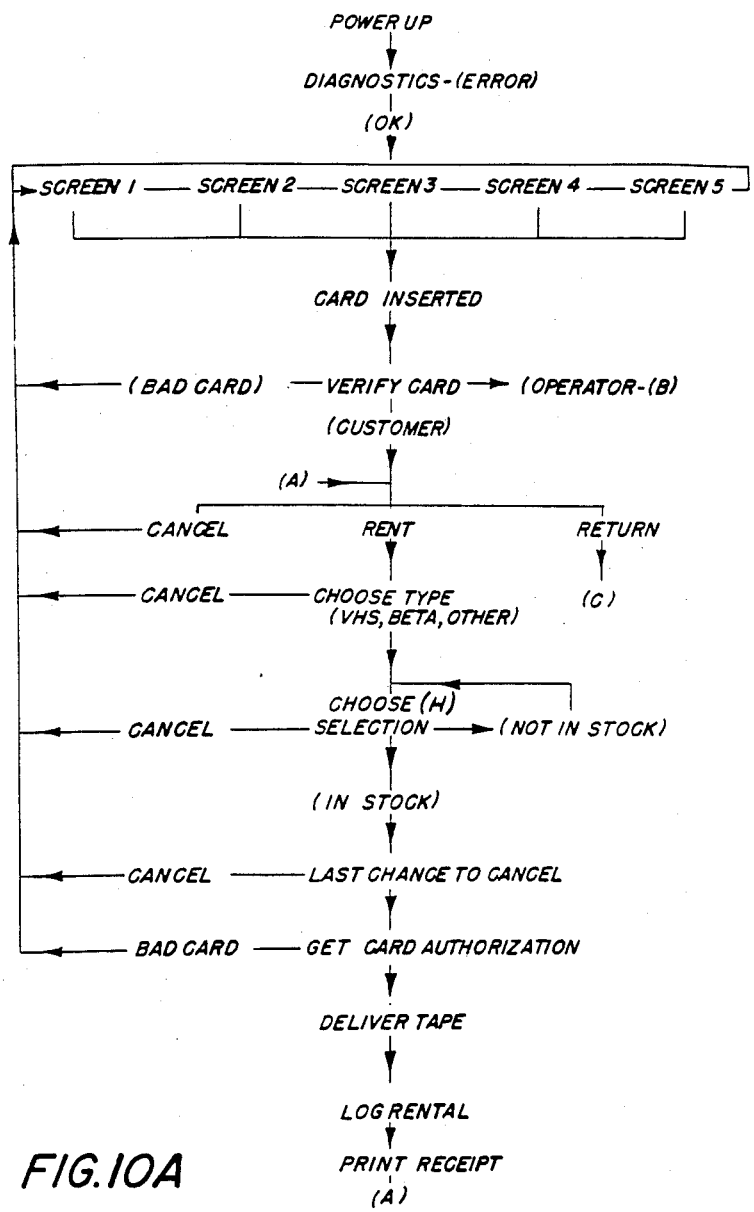
FIG.IOA

APPARATUS AND METHOD FOR STORING AND RETRIEVING ARTICLES

BACKGROUND OF THE INVENTION

The present invention relates to a machine for vending or renting videocassettes and for accepting return of rented videocassettes. As used herein, "videocassettes" includes prerecorded or blank videocassettes or videodiscs.

With the proliferation of home videocassette recorders, there has also arisen a market for pre-recorded videocassettes for home viewing. Pre-recorded videocassettes can, of course, be purchased or rented at selected retail or rental outlets. However, pre-recorded videocassettes are expensive, and hence few stores maintain a large inventory in such expensive items, either for sale or rental. In addition, such stores are not necessarily conveniently located to a large segment of the public, and store hours may not be convenient. Accordingly, there is a need to provide a conveniently located vending machine from which a user can purchase or rent and return videocassettes at any time of day. For maximum customer convenience, it would be desirable if the customer's purchase or rental could be charged to a conventional credit card account.

A number of attempts have been made at providing such a machine. For example, U.S. Pat. No. 4,414,467 discloses a videocassette ordering terminal at which a user can preview or order a videocassette for rental. The terminal permits a customer to select a videocassette for rental and return the videocassette to the terminal at the end of the rental period. No provision is made for an outright purchase of a videocassette, however. The rental can be charged to the customer's credit card account. A major drawback of this machine is that, when a videocassette is returned to the terminal, it cannot be placed back "on the shelf" for another rental without the intervention of a human operator, who must restock the machine. Such a machine requires a large expenditure of time, and money, to keep it stocked. If it is not restocked frequently, its convenience, and hence customer appeal, is greatly reduced.

U.S. Pat. No. 4,458,802 is an attempt to solve the problem of how to automatically restock the machine. In this patent, a carousel arrangement is used in which a videocassette to be rented and returned is assigned to a particular compartment on the carousel. There is an exact one-to-one correspondence between the videocassette and the compartment. A videocassette to be rented is vended from that compartment and, upon return, is accepted back only into that compartment. This arrangement permits some restocking, but unnecessarily limits the number of videocassettes which can be conveniently stored in the machine.

It is an object of the present invention to provide a videocassette vending machine for selectively vending or renting and returning videocassettes which overcomes the problems associated with prior vending machines.

SUMMARY OF THE INVENTION

The present invention is an apparatus for selectably vending or renting videocassettes to a customer, and comprises videocassette storage means for storing a plurality of videocassettes in discrete identifiable locations. The apparatus has customer identification means for receiving information about the customer and mode selection means for enabling the customer to select among a vend mode, a rent mode and a return mode. Videocassette selection means are provided for enabling the customer to select a desired videocassette to be vended or rented. Also provided are customer access means for dispensing the selected videocassette to the customer in the vend and rent modes and receiving the videocassette from the customer in the return mode. Videocassette identification means are provided for receiving information representative of the identity of the videocassette being returned in the return mode. The apparatus has videocassette transport means for transporting the selected videocassette from the storage means to the customer access means in the vend and rent modes and transporting the videocassette from the customer access means to any available empty discrete location in the storage means in the return mode. A memory means is provided for storing information about the customer, the selected mode, the selected videocassette and the coordinates of videocassettes and available empty discrete locations in the storage means.

DESCRIPTION OF THE DRAWINGS

For the purpose of illustrating the invention there is shown in the drawings a form which is presently preferred; it being understood, however, that this invention is not limited to the precise arrangements and instrumentalities shown.

FIG. 1 is a front elevation view of a videocassette vending machine in accordance with the present invention.

FIG. 2 is a cross-sectional view taken along the lines 2—2 of FIG. 1.

FIG. 3 is a partial sectional view taken along the lines 3—3 of FIG. 2.

FIG. 4 is a block diagram of the major components of the apparatus of the present invention.

FIG. 7 is a sectional view taken along the lines 7—7 of FIG. 5.

FIG. 8 is a sectional view taken along the lines 8—8 of FIG. 6.

FIG. 9 is an enlarged view, partially broken away, of the customer access door of the present invention.

DESCRIPTION OF THE PREFERRED EMBODIMENT

Figure 5:
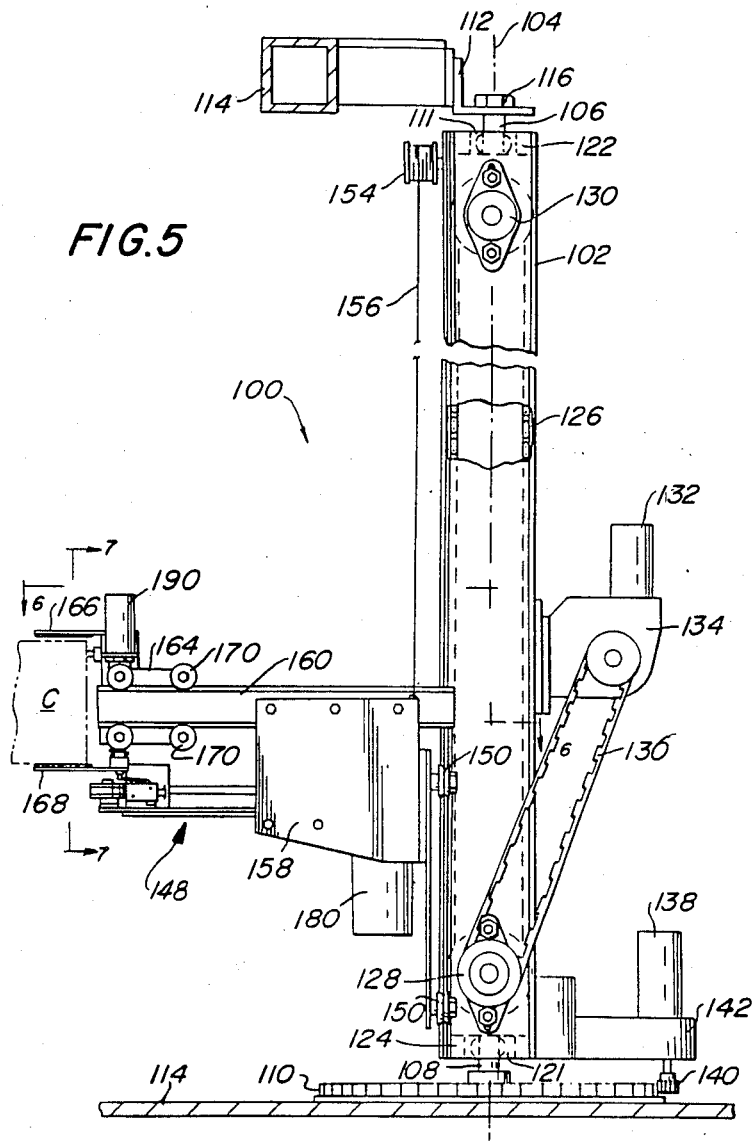
FIG. 5 is an elevation view of the videocassette transport means taken along the lines 5—5 of FIG. 12.

Referring now to the drawings, wherein like numerals indicate like elements, there is shown in FIG. 1 a videocassette vending machine 10 in accordance with the present invention. Vending machine 10 comprises a cabinet 12 which in turn consists of a shell 14 and a door 16 which is hinged along one side of shell 14 to provide access to the interior of shell 14 from the front of cabinet 12. Mounted on the front of door 16 and movable with it are a customer identification means in the form of credit card reader 18. Also mounted on the front of door 16 are mode selection push buttons 20 and a keypad 22 by means of which a customer can select a desired videocassette to be vended or rented and enter other numerically-coded information, e.g., a personal identification number, to vending machine 10. A CRT display 24 is provided on the front of door 16 for displaying information and messages to the customer, and for displaying information to the owner/operator of the machine, as will be described in greater detail below. A printer 26 is also provided on the front of door 16 for printing customer receipts, coupons, reports for the owner/operator and the like.

Card reader 18 may be any commercially-available credit card reader which reads magnetically-coded information contained on the magnetic stripe on the back of a conventional credit card. Card reader 18 generates digital output signals representative of the magnetically-coded information. Instead of or in addition to card reader 18, a coin or bill accepting unit 19 can be provided, so that a customer can rent or purchase tapes using either a credit card or cash, or both. An appropriate pushbutton 20 may be provided which enables the customer to choose between cash and credit modes of operation. Customer keypad 22 may be any suitable twelve position numeric keypad containing the digits 0 through 9 and the symbols "*" and "#". Owner keyboard 32 may be any suitable alphanumeric keyboard for communicating with CPU 38. Printer 26 may be any suitable 21-column printer. Memory unit 34 may be any suitable memory. Although a floppy disk memory is preferred, any other suitable memory unit, such as a magnetic core memory, semiconductor memory, and the like, may be employed.

CRT 24 and modem 36 may be any suitable commercially-available devices. Scanner 30 is preferably, but need not be, a bar code reader. When a bar code reader is used for scanner 30, videocassettes to be vended by machine 10 are provided with a suitable bar code which can indicate, inter alia, an identifying number, title, owner number, and the like.

A customer access door 28 is provided in door 16 for dispensing a selected videocassette to be vended or rented and for receiving a videocassette to be returned to vending machine 10. Mounted on customer access door 28 is located a videocassette identification means in the form of an optical scanner 30. (See FIG. 2.) Scanner 30 receives information relative to the identity of a returned cassette when the cassette is inserted into customer access door 28.

Also mounted on the interior of door 16 (see FIG. 2) are an owner/operator keyboard 32 by means of which the owner/operator (also referred to herein as "owner" or "operator") can communicate with vending machine 10, a central processor unit, or CPU 38, a memory unit 34, and a modem 36 by means of which videocassette vending machine 10 may communicate with a host processor.

As best seen in FIG. 2, the interior of shell 14 is provided with a videocassette storage means 40. In the plan view, storage means 40 is arcuate in shape and encompasses a substantial portion of the circumference of a circle centered along the axis of the videocassette transport means, to be described in greater detail below. Storage means 40 extends from the top to the bottom of the interior of shell 14 parallel to the axis of the videocassette transport means, and comprises a plurality of shelves 42 which extend horizontally. Extending vertically are a plurality of internal walls 44, 46, 48, etc., which define vertically-oriented channels therebetween. Walls 44, 46, 48, etc., are slotted at uniformly-spaced locations to receive shelves 42. Shelves 42 and walls 44, 46, 48, etc., define a plurality of videocassette storage locations 50, 52, etc., which hold videocassettes to be vended. By using this arrangement, storage space is minimized while the number of available storage locations is maximized. For example, approximately 500 storage locations may be provided in a cabinet only seven feet high by three feet deep by four feet wide. Shelves 42 are canted downwardly at their external edge 54 to facilitate insertion of videocassettes C into the storage compartments.

Walls 44, 46, 48, etc. are provided with struckout portions 56 which extend into storage locations 50, 52, etc. Struckout portions 56 are resiliently deformable toward walls 44, 46, 48, etc., and help grip a videocassette after it has been inserted into a storage location and hold it securely in that location.

A preferred form of walls 44, 46, 48, etc., is shown in FIG. 9. As can be seen from FIG. 9, each wall may be formed from a sheet of suitable metal, such as galvanized stainless steel or aluminum, which is bent to form substantially a V-shape. During the forming process, flanges 58 and 60 are formed at the open ends of the V. Each individual wall may be attached to an arcuate supporting shell 62 by any suitable means, such as by rivets 64. Flanges 58 and 60 of adjacent walls may be overlapped, as shown in FIG. 9, and riveted together to shell 62. Individual walls can thus be attached around the entire circumference of shell 62. The closed end of the V is tapered, as at 64, to facilitate insertion of a videocassette C into the individual storage locations formed by the walls and shelves 42. Of course, it is understood that any other method of forming the walls, such as an extrusion process, and any other suitable material, such as an engineering plastic, may be used. This structure enables storage means 40 to be manufactured quickly and at low cost.

As seen in the figures, the precise position of a storage location within shell 14 can be defined by a system of cylindrical coordinates $(r, \theta, z)$. The r direction, indicated by the arrow in FIG. 2, is radial of the axis of the transport means. The $\theta$ coordinate represents the angular position of the videocassette transport means with respect to a reference point. The videocassette transport means is capable of movement in both the clockwise and counterclockwise directions, as will be described below. The z coordinate represents movement of the videocassette transport means perpendicular to the plane of FIG. 2 along the axis of the videocassette transport means, as will be described below.

The interconnection of the major components of the machine is best seen in the block diagram of FIG. 4. As shown in FIG. 4, the videocassette vending machine 10 is governed by CPU 38, which may be any suitable microprocessor-based CPU. For example, an IBM compatible MS/DOS-driven CPU may be utilized. Alternatively, a standard bus system may be used. The CPU 38 receives inputs from scanner 30, owner/operator keyboard 32, credit card reader 18, keypad 22, and mode selection switches 20. CPU 38 also receives as inputs signals from limit switches associated with customer access door 28 and the videocassette transport means 100 (described below), which provide information to CPU 38 indicative of the state of customer access door 28 (i.e., open or closed) and the z and $\theta$ positions of the videocassette transport means. Specifically, the following inputs are provided to CPU 38 by means of limit switches:

1. limit of motion upward in z direction
2. limit of motion downward in z direction 3. limit of motion clockwise in θ direction
4. limit of motion counterclockwise in θ direction
5. picker assembly extended in r direction
6. picker assembly retracted in r direction
7. picker fingers open/closed
8. videocassette in picker assembly
9. customer access door open
10. videocassette in access door
11. picker assembly home—z position
12. picker assembly home—θ position Each of the limit switches will be described in greater detail below. CPU 38 also receives demodulated data transmitted to videocassette vending machine 10 from a host processor by means of modem 36.

CPU 38 generates a number of data and control outputs in response to its inputs. CPU 38 generates printer control and data signals for printer 26, alphanumeric display characters for CRT 24 and data outputs for storage in memory unit 34. CPU 38 also generates appropriate timing and control signals for scanner 30, owner/operator keyboard 32, card reader 18, and keypad 22.

CPU 38 generates control signals to the various solenoids and electric motors associated with videocassette transport means 100, and a control signal for the locking solenoid associated with customer access door 28. Specifically, the following control signals are generated by CPU 38:

1. upward z-direction motor drive on/off
2. downward z-direction motor drive on/off
3. z-direction motor speed fast/slow
4. clockwise θ-direction motor drive on/off
5. counterclockwise θ direction motor drive on/off
6. θ-direction motor speed fast/slow
7. picker solenoid open/close
8. outward r-direction picker assembly motor drive on/off
9. inward r-direction picker assembly motor drive on/off
10. customer access door latch open/close As noted above, CPU 38 may be an IBM PC-compatible microcomputer. Thus, CPU 38 can be programmed to perform a number of different functions and to provide for a number of data bases. Although any number of different data bases will suggest themselves to those skilled in the art, the data bases listed in Table I below are typical of the type of data bases which can be programmed into CPU 38.

TABLE I

| Data Base | Function |
|---|---|
| Inventory | Current machine contents including rented items |
| Transaction | All rentals and purchases |
| Cost codes | Rental fees |
| Credit card data | Miscellaneous card data |
| Card digit flags | Valid cards |
| Multiple rental discounts | Discounts based on multiple rentals |
| Matinee table | Matinee discounts |
| Levels of access | Provide different access levels for owner, clerk, serviceman |
| Passcode, opcode and access level table | Definition of codes |
| Lost sales | Sales lost due to item not in stock |
| Error log | System failures and messages |
| Device installation list | Simulate various machine components for troubleshooting |
| Definable variables | Assorted operational parameters |

The inventory data base may consist of a linear array whose size is equal to the total number of storage locations available in the vending machine 10. Each individual inventory record may contain the following information:

| | | |
|---|---|---|
| 1. Selection number | 4 | digits |
| 2. Cost code | 1 | digit |
| 3. Title | 20 | characters |
| 4. Category | 1 | digit |
| 5. Rating | 1 | digit |
| 6. Owner number | 3 | digits |
| 7. Copy number | 2 | digits |
| 8. Purchase only price | 4 | digits |
| 9. Row number | 2 | digits |
| 10. Column number | 2 | digits |
| 11. Type | 1 | digit |

The selection number may be a unique number which the customer uses to identify the product he wishes to purchase or rent. The cost code identifies the prices applicable to the product dependent upon the cost code and matinee tables, discussed below. The title is a 20 character alphanumeric description of the videocassette. The category is a single digit that defines operator-selected categories. As an example, the digit 0 may refer to westerns, the digit 1 to comedies, the digit 2 to science fiction, and so forth. The rating is a single digit that defines the MPAA ratings of films. For example, the digit 0 may represent a G rating, the digit 1 may represent a PG rating, and so forth. The owner number is a three-digit number which defines the owner of the particular videocassette in inventory. The copy number is a two-digit number dependent upon the number of copies of the same videocassette. Obviously, multiple items with the same selection number will have different copy numbers. The purchase only price is used only if the videocassette is available for purchase only. If the videocassette is for rental, this field is all zeros.

The row number and column number are two-digit fields which reflect the location of the videocassette in the storage means. These digits are set to zero if the product is currently rented out. When an item is purchased, either deliberately or by default by not returning a rental cassette, the inventory record for the item is cleared.

The type digit identifies the product type, such as VHS, Beta, 8 mm, purchase only, or any other product type. Note that items for outright purchase, such as prerecorded or blank videocassettes, can be vended outright.

The transaction data base may be a liner array whose sizes are equal to the total number of transactions that may be stored in memory unit 34. Each individual transaction record may contain the following information:

| | | |
|---|---|---|
| 1. Credit card number | 16 | digits |
| 2. Credit card expiration date | 4 | digits |
| 3. Authorization number | 4 | characters |
| 4. Rental/purchase time | 4 | digits |
| 5. Rental/purchase date | 4 | digits |
| 6. Return time | 4 | digits |
| 7. Return date | 4 | digits |
| 8. Rental/purchase cost | 5 | digits |
| 9. Transaction open/closed/ processed | 5 | digits |
| 10. Selection number | 4 | digits |
| 11. Cost code | 1 | digit |
| 12. Title | 20 | characters |
| 13. Category | 1 | digit |
| 14. Rating | 1 | digit |
| 15. Owner number | 3 | digits |

-continued

| | | |
|---|---|---|
| 16. | Copy number | 2 digits |
| 17. | Purchase only price | 4 digits |
| 18. | Row number | 2 digits |
| 19. | Column number | 2 digits |
| 20. | Type | 1 digit |

It will be observed that items 10–20 are the same as in an inventory data base record. This will be redundant information for rental items, but will be necessary for purchase items. A transaction record is created when the rental transaction is initiated and it is kept in the memory unit 34 until the transaction is billed to the customer's credit card account.

The cost code data base is used to define the cost of any item that is available for both rental and purchase. This table can store both the base rental and purchase price, keyed by cost code and day code. There may be ten cost codes, zero through nine, each of which represents a different purchase and/or rental price. The rental price can also vary according to day of the week, so that rentals may be made cheaper during off-peak rental days and more expensive during high-peak rental days.

The credit card data base is capable of storing the customer's sixteen digit credit card number along with additional information about the customer, indexed by his credit card number. For example, a one digit code may be used to indicate whether the customer habitually returns rented videocassettes in a damaged condition. If so, the owner/operator may no longer wish to rent videocassettes to that customer, and can so indicate by an appropriate code, and the vending machine will not accept that credit card. The credit card data base can also keep track of accumulated rentals by a particular customer. This is useful in the event that the owner/operator wishes to run special promotions such as a free rental with every ten paid rentals. The data base can also keep track of the date and time of the customer's last rental.

The card digit flags table can be used to indicate various credit card parameters. For example, the vending machine 10 can be set to accept only credit cards whose first digits correspond to certain numbers. For example, American Express credit cards normally begin with the number 3, Visa cards with the number 4, and Mastercard cards with the number 5. The machine can thus be set to accept only selected credit cards. The machine can also be set to accept only a credit card, such as a "club card", issued by the owner/operator. Such cards may be given a zero or nine as the first digit to uniquely identify them as cards issued by the owner/operator. In addition, a club card can be given a second flag digit, such as the last digit of the card number, which can be used to indicate that certain classes of films, such as adult films, cannot be vended or rented on that card.

The multiple rental discount data base is used if a customer rents more than one videocassette at a time. The data base can be used to grant discounts for multiple rentals.

The matinee table provides for reduced rentals at off-peak periods. Each cost code, discussed above, has a matinee table entry. If the videocassette is rented after a specified time and returned before a specified time on the same day, a discount may be applied to the rental.

The levels of access data base defines three levels of access to information stored in memory unit 34. This allows various classes of the owner/operator's employees access to only predetermined data.

Analogous to the levels of access data base is the pass code, opcode and access level data base. There may be three pass code cards which provide access to various operating commands as defined by their access level. The owner/operator may be given the highest access. His data processing clerk may be given the next level of access, and his serviceman may be given the lowest level of access. Each level of access also has access to levels below, but not to the levels above it.

The lost sales data base is used to maintain a sequential list of all lost sales due to a requested videocassette being unavailable for sale or rental. This list may be as long as necessary and is limited only by storage space in memory unit 34. This list enables the operator to keep track of high-demand videocassettes so that the operator can adjust the mix of videocassettes available for sale or rental for the particular market.

The error log data base is used to maintain a sequential list of errors and messages that are deemed important enough to save for later operator inspection. As an example, the data base may keep track of malfunctions in the videocassette transport means, failure of the scanner 30, lack of paper for printer 26, and the like. CPU 38 may also be provided with the ability to call the owner's host processor via modem 36 to alert the owner to problems before they affect the ability of his machine to service customers.

The device installation data base is used primarily for de-bugging the system. Certain devices can be simulated through the owner/operator keyboard 32.

The definable variables data base allows the owner/operator to define his own unique variables such as maximum rental time, rental grace period, number of rentals required to receive a free rental, number of open rentals allowed per credit card, and the like.

The CPU 38 can also be programmed to generate reports and receipts which can be printed by printer 26. The following reports and receipts can be generated:
1. Rental receipt
2. Return receipt (normal)
3. Return receipt (conditional)
4. Lost sales report
5. Current inventory report
6. Videocassettes out report The rental receipt, generated when a rental tape is dispensed, may display the selection number, selection title, date, time, credit card number, authorization code and machine number. The normal return receipt may display the selection number and title of the selection, the date and time out, date and time returned, credit card number, authorization number, machine number and rental charge. The conditional return receipt is printed if the returned videocassette is unacceptable for any reason, e.g., if the output of scanner 30 indicates that the returned videocassette was not rented from that machine or is not in the owner's inventory. This receipt may display a telephone number of the owner/operator which the customer can call for service. The lost sales report can display the selection numbers of requested but unavailable videocassettes and the number of requests made for those videocassettes. The current inventory report may be a listing of selection, cost code, title, category, type, owner number, copy number, purchase price, row and column number. This information can also be printed out for the "videocassettes out" report.

All of the data bases can be uploaded to a host processor by means of modem 36. The modem is capable of either initiating a call or receiving a call to or from the host processor. The data bases may be uploaded to the host processor from the videocassette vending machine 10 or downloaded from the host processor to machine 10. This permits the owner/operator of a number of machines 10 to perform all record keeping at a central host processor site.

A feature of the invention is the ability of CPU 38 to display a number of different messages via CRT 24. These messages, or "screens", include operator-defined screens which enable the owner/operator to display custom-designed messages, and screens which may display instructions and prompts to the customer. CRT may also display data and reports to the owner/operator, and special screens to enable the owner/operator to troubleshoot and set up the machine.

The way in which CPU 38 can be programmed to provide these and other data bases, and to carry out the above-described and other functions, is well within the ordinary skill in the art and need not be described here.

The mechanical structure of videocassette transport means 100 is illustrated in FIGS. 5-8. As best seen in FIG. 5, transport means 100 comprises a vertical mast 102 which is mounted for revolution about a central longitudinal axis 104. Mast 102 is journaled with a self-aligning feature for revolution about axis 104 by cylindrical pins 106 and 108 at the top and bottom, respectively, of mast 102. Pin 108 is fixed in a recess (not shown) coaxial with circular sun gear 110 and projects through a self-aligning bearing 121 in an opening in spacer block 124 at the bottom of mast 102. Pin 106 projects through an opening in bracket 112, which is fixed to the internal framework 114 of videocassette vending machine 10. Pin 106 also projects through a self-aligning bearing 111 an opening in spacer block 122 at the top of mast 102. For ease of installation of mast 102 during assembly of machine 10, mast 102 is simply lowered into place on pin 108 in sun gear 110, pin 106 is inserted into spacer block 122 through bracket 112, and the head 116 of pin 106 is then welded or otherwise fastened to bracket 112.

Figure 6:
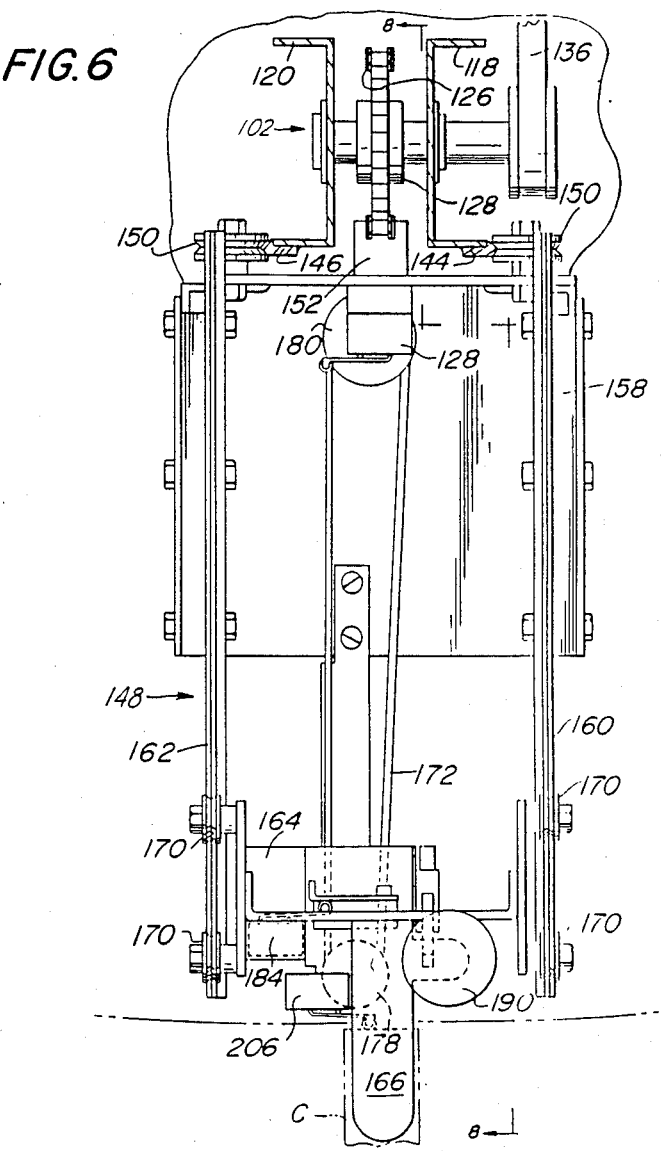
FIG. 6 is a sectional view taken along the lines 6—6 of FIG. 5.

As best seen in FIG. 6, mast 102 comprises two back-to-back "U"-shaped channels 118 and 120 which are spaced apart by spacer blocks 122 and 124 (see FIG. 5). Additional spacer blocks (not shown) may be provided internally of mast 102. In the space between channels 118 and 120 is located an endless chain 126 which passes around a drive sprocket 128 near the bottom of mast 102 and an idler sprocket 130 near the top of mast 102. Drive sprocket 128 is in turn driven by a DC electric motor 132 via appropriate reduction gearing in gear box 134 and timing belt 136. Motor 132 is mounted on gear box 134, which in turn is mounted on mast 102 for movement with it. A shaft encoder (not shown) on the shaft of motor 132 is provided to generate output pulses which represent the revolution of the motor shaft, and which are processed in CPU 38 to provide a signal indicative of the linear movement of chain 126 within mast 102.

Also mounted adjacent the bottom of mast 102 is a second DC electric motor 138 which drives a spur gear via appropriate reduction gearing in gear box 142. Motor 138 is mounted on gear box 142, which in turn is mounted on mast 102 for movement with it. Spur gear 140 meshes with sun gear 110, so that as spur gear 140 is driven by motor 138, the entire mast assembly 102 revolves around axis 104. As with motor 132, the shaft of motor 138 is equipped with a shaft encoder (not shown) which generates pulses indicative of the revolution of the shaft of motor 138, and which are processed in CPU 38 to generate signals representative of the angular position of the mast about axis 104. The angular position of the mast, and revolution of the mast, are referred to as the $\theta$ position and $\theta$ movement.

As with all DC motors, motors 132 and 138 can be driven in either direction, depending upon the polarity of the applied voltage. Motors 132 and 138 can also be driven at fast or slow speeds depending upon the amplitude of the applied voltage.

As best seen in FIG. 5, motors 132 and 138 are preferably mounted on the same side of mast 102. On the opposite side of mast 102, channels 118 and 120 are provided with rails 144 and 146, respectively, which extend the entire height of mast 102. A "picker" assembly 148 is mounted for movement on rails 144 and 146 by means of grooved wheels 150. It will be noted that two pairs of wheels 150 are provided on either side of mast 102, so that picker assembly 148 grips mast 102 firmly. As shown in FIG. 7, wheels 150 may be mounted eccentrically to facilitate assembly of picker 148 onto rails 144 and 146 and to adjust for a firm grip on mast 102. The entire picker assembly 148 is attached to chain 126 by bracket 152 so that as chain 126 moves linearly up and down within mast 102, picker assembly 148 will be moved from top to bottom of mast 102 along rails 144 and 146. The movement of picker assembly 148 up and down on mast 102 is referred to as movement in the z direction.

Although they have been omitted from the drawings for clarity, limit switches are provided at the top and bottom of mast 102 to indicate the extreme positions of travel of picker assembly 148 up and down with respect to mast 102. Limit switches are also provided at the extreme clockwise and counterclockwise $\theta$-positions of transport means 100.

Additional limit switches, omitted from the drawings for clarity, are provided to indicate when the picker assembly 148 is in a reference, or "home", position in both the z and $\theta$ directions. A preferred home position is adjacent customer access door 28.

It will be appreciated from the foregoing that the videocassette transport means 100 is capable of movement in both $\theta$ and z directions. Thus, the picker assembly 148 can be positioned at any location which can be defined by ($\theta$, z) coordinates. Since the videocassette storage means is arcuate in shape and extends from top to bottom of shell 14, each storage location within the videocassette storage means can be identified by a ($\theta$, z) coordinate. Hence, picker assembly 148 can be located adjacent any storage location in the videocassette storage means by directing picker assembly 148 to move to the appropriate ($\theta$, z) coordinates for that storage location.

In order to smooth out the movement of picker assembly 148 as it moves up and down on mast 102, a counterweight 154 in the form of a coil spring and cable 156 is provided. The extreme end of cable 156 is attached to the carriage 158 of picker assembly 148, while the other end is attached to counterweight 154. Counterweight 154 provides a restraining force against the force of gravity as picker assembly 148 is moving downwardly, and applies an assisting force against the force of gravity as picker assembly 148 moves upwardly. This enables the picker assembly 148 to move smoothly up and down on mast 102.

As can be seen in FIGS. 5, 6 and 8, picker assembly 148 consists of a carriage 158 which supports a pair of rails 160 and 162 which extend perpendicularly from mast 102. Mounted on rails 160 and 162 is a second carriage 164 which carries picker fingers 166 and 168, to be described in greater detail below. Carriage 164 is mounted on rails 160 and 162 by grooved wheels 170 which ride on the edges of rails 160 and 162. Four pairs of wheels 170, two pairs above and two below rails 160 and 162, are provided so that carriage 164 grips the top and bottom of rails 160 and 162 for a rigid mount. Wheels 170 are eccentrically mounted, as wheels 150, for the same reasons. Carriage 164 is attached to a carriage drive belt or timing belt 172 at location 174. Belt 172 is an endless belt which passes around drive pulley 176 and idler pulley 178. Drive pulley 176 is driven by DC electric motor 180 mounted on carriage 158. As the shaft of motor 180 rotates, belt 172 moves linearly in a direction perpendicular to mast 102 and parallel to rails 160 and 162. Thus, as belt 172 moves linearly, carriage 164 moves toward and away from mast 102, depending upon whether motor 180 is driven in the forward or reverse directions. This movement of carriage 164 with respect to mast 102 is referred to as movement in the r direction. It will be appreciated that the precise position of carriage 164 can therefore be defined by cylindrical coordinates $(r, \theta, z)$. That is, carriage 164 can be located at any point which can be defined by cylindrical coordinates.

The extreme positions of carriage 164 on rails 160 and 162 is sensed by limit switches 182 and 184. Limit switch 182 indicates when carriage 164 is retracted, i.e., at its extreme position closest to mast 102, while limit switch 184 indicates when carriage 164 is extended, i.e., at its extreme outer position. At all times, carriage 164 will be at either of these positions or in transit between these two positions.

Operation of picker assembly 148 in grasping a videocassette for transport can best be understood by reference to FIG. 7. Picker assembly 148 comprises a pair of picker fingers 166 and 168 for grasping videocassette C which is to be transported by videocassette transport means 100. Picker finger 166 is mounted at one end of a bracket 186 so that picker finger 166 remains stationary with respect to carriage 164. Picker finger 166 is mounted on a rod 188 for up and down movement with respect to carriage 164. Up and down movement to rod 188, and thus picker finger 168, is imparted by a solenoid 190, whose shaft 192 is attached to rod 188. When solenoid 190 is energized, the solenoid shaft 192 retracts, causing rod 88 and picker finger 168 to move upwardly. Thus, when solenoid 190 is actuated, a videocassette C can be gripped by fingers 166 and 168. Fingers 166 and 168 may be lined with friction pads 192 and 194 to help grip videocassette C. Rod 188 can be kept from rotating, thus preventing finger 168 from pivoting, by attaching to rod 188 a collar 189 arranged to receive a pin 191 fixed in guide block 193. Pin 191 constrains collar 189 to move up and down without rotating, thus preventing rod 188 from rotating as well.

A limit switch 196 indicates when picker finger 168 is at its extreme lower position. Thus, the state of limit switch 196 (on or off) indicates whether the picker fingers 66 and 168 are open or closed.

As already noted, when solenoid 190 is energized, picker finger 168 is moved upwardly into the closed position to grip videocassette C between fingers 166 and 168. Finger 168 may be held in the gripping position by means of a latching bar 198 which cooperates with a notch 200 in rod 188. Latching bar 198 is moved reciprocally toward and away from rod 188 by a solenoid 202. Solenoid 202 is normally de-energized, so that latching bar 198 is urged toward rod 188 by coil spring 204. As will be appreciated from FIG. 7, when solenoid 202 is de-energized, rod 188 may move upwardly without restraint, so that picker finger 68 may be moved to the gripping position. Once finger 68 is in the gripping position, however, latching bar 98 enters notch 200, and holds finger 168 in the gripping position. Latching bar 198 will not release finger 168 unless solenoid 202 is energized to retract latching bar 98. This provides a safety feature in the event of an unexpected interruption of machine power, so that in the event videocassette transport means 100 is in the act of moving a cassette from one location to another, deenergization of solenoid 190 will not allow finger 168 to be released and drop the videocassette.

Also mounted on carriage 164 is a limit switch 206 for sensing whether or not a cassette is present in picker mechanism 148. Limit switch 206 provides an indication of whether or not a videocassette C is present and properly seated with respect to picker fingers 166 and 168. This provides an additional safety feature so that, when transporting a cassette, videocassette transport means 100 will only be actuated if a videocassette C is properly seated in finger assembly 148.

A unique feature of videocassette transport means 100 is that it is self-calibrating each time videocassette vending machine 10 is powered up. Each time the machine 10 is turned on, the CPU causes picker assembly 148 to move to its extreme z and $\theta$ positions ($\theta_{cw}$ max, z min), ($\theta_{cw}$ max, z max), ($\theta_{ccw}$ max, z max , and ($\theta_{ccw}$ max, z min) and then return to its "home" position. As picker assembly 14B moves from position to position and then home, CPU 38 counts the number of pulses generated by the shaft encoders on motors 132 and 138 between each position. The number of pulses, which correspond to the distance between extremes of z and $\theta$ positions, are stored for reference. These reference pulses are used by CPU 38 when generating ($\theta$, z) commands to transport means 100. In this way, videocassette transport means 100 can be made insensitive to changes in the number of pulses between extreme positions which may result from manufacturing tolerances, wear and tear, chain stretch, and the like. Transport means 100 calibrates itself, rather than requiring an operator to calibrate it manually.

Referring now to FIG. 9, customer access door 28 is shown in greater detail. Access door 28 is pivoted about an axis 208 which extends vertically, i.e., parallel to the z axis of videocassette transport means 100. Access door 28 is provided with a front panel 210 which has a peripheral edge portion 212 which acts as a limit stop in cooperation with the edges of opening 214 in door 16. Access door 28 has a handle portion 216 into which a customer may insert his fingers to open access door from the closed position (shown in solid in FIG. 9) to the open position (shown in phantom in FIG. 9).

Access door 28 has a videocassette receiving cavity 218 into which a videocassette is inserted either by picker mechanism 148 for dispensing or by the customer when a videocassette is to be returned. Scanner 30 is mounted on one wall of cavity 218, and is arranged to view through opening 219 the identifying bar code on a videocassette being inserted into cavity 218, either by the picker 148 when dispensing or by the customer when returning a videocassette. Although not shown in FIG. 9, a sensing switch can be located in receiving cavity 218, preferably along the back wall thereof, which is closed upon insertion of a cassette and which provides a signal to CPU 38 that a cassette has been inserted in access door 28.

Also omitted from FIG. 9 is a locking solenoid which locks access door 28 in the closed position when the machine 10 is not dispensing or accepting videocassettes. When a videocassette is to be dispensed or returned, the locking solenoid is energized to release door 28, so that it can be opened by the customer for removal or insertion of videocassettes.

As seen in FIG. 9, access door 28 is adapted so that the axis of receiving cavity 218 will be radial with respect to transport means 100. This facilitates the ability of picker mechanism 148 to insert and remove videocassettes in cavity 218. It can also be seen from FIG. 9 that the structure of customer access door 28 makes it virtually impossible for a customer to insert his fingers or any foreign object into machine 10 through opening 214. Access door 28 is provided with a guard flange 220 which effectively closes opening 214 when the access door 28 is fully open.

Access door 28 may also be provided with a mechanical keying arrangement within receiving cavity 218, so that only appropriately keyed videocassettes will fit into receiving cavity 218. If a non-keyed videocassette is attempted to be inserted, access door 28 cannot be closed. Videocassettes are customarily rented in protective boxes. When access door 28 is provided with mechanical keying means, mating means will necessarily need to be provided on the videocassette box. By so keying customer access door 28 and the videocassette box, only appropriately keyed videocassettes can be returned to the machine. Thus, this prevents the return of a different videocassette in place of the one rented.

As an additional check on the identity of the videocassette being returned, each videocassette is provided with a unique code, such as a bar code, as described above. The protective box is provided with a transparent window, or may be made entirely transparent itself, so that the identifying bar code on the videocassette can be scanned by scanner 30 once a properly-keyed videocassette is inserted into machine 10 via customer access door 28.

Figure 10B:
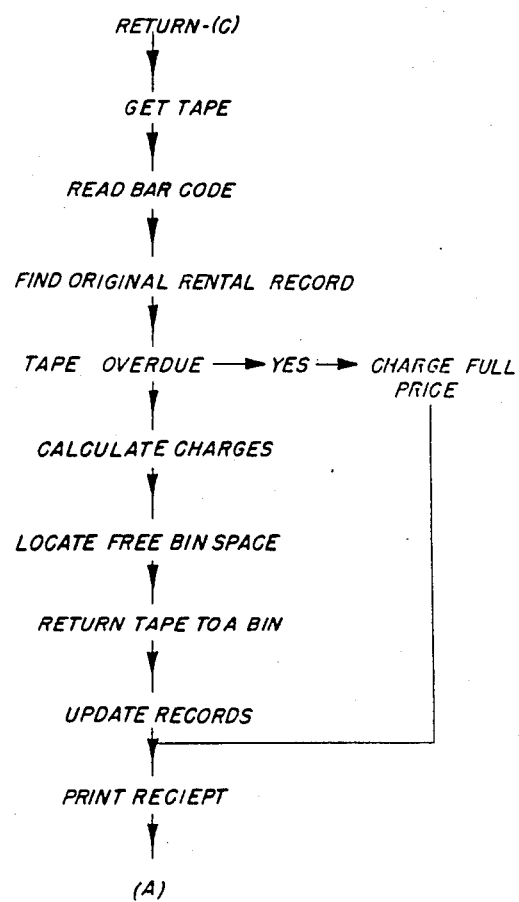
FIG. 10, consisting of A through C, is a flow chart illustrating the operation of the apparatus of the present invention.
Figure 10C:
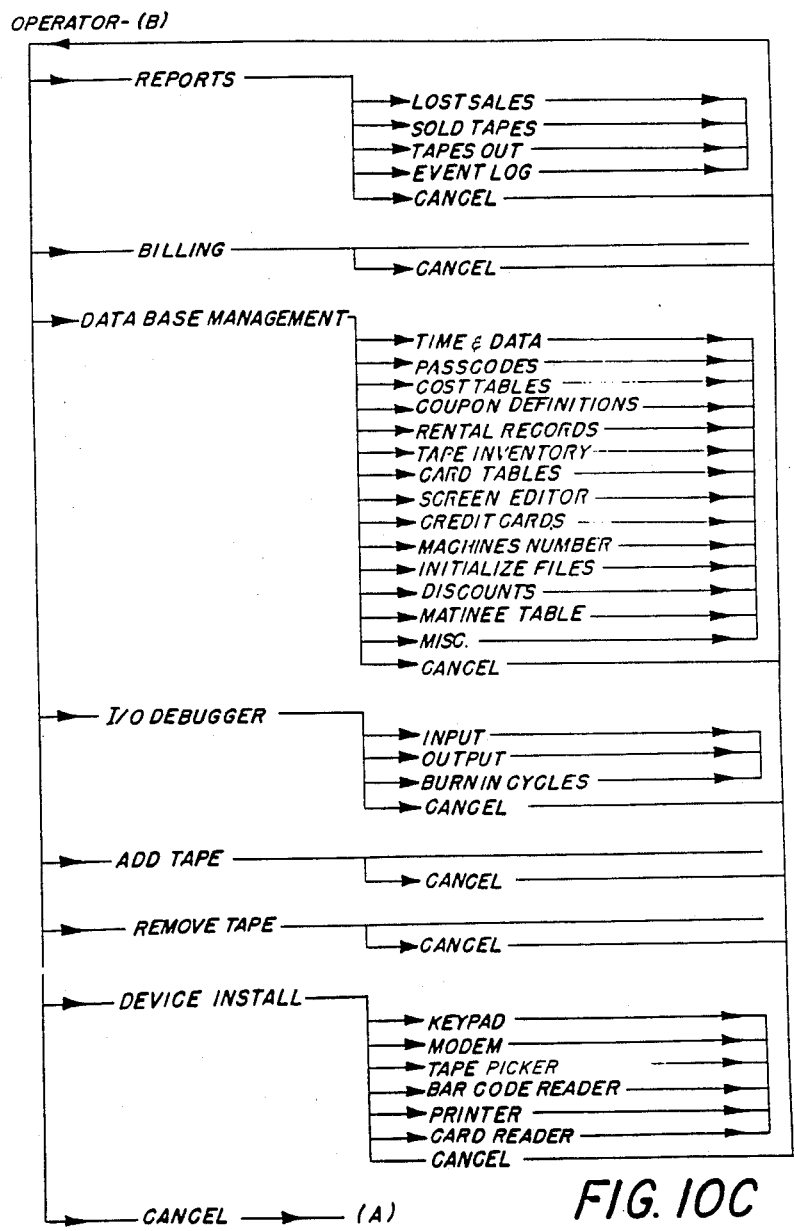

Operation of the videocassette vending machine can be readily understood with reference to the block diagram of FIG. 10.

When machine 10 is powered up, CPU 38 first executes a pre-programmed diagnostics routine to be certain that machine 10 and all of its subsystems are properly operating. If an error or malfunction is found, an error message is displayed to the operator. The error must be located and corrected before the machine is available for operation by a customer. If the results of the diagnostic routine indicate that the machine 10 and all of its subsystems are properly functioning, CPU 38 commands CRT 24 to sequentially display a pre-programmed number of different screens. As an example, screen 1 may display a message such as "THE MACHINE IS READY TO TAKE YOUR PURCHASE OR RENTAL ORDER—INSERT CREDIT CARD". Screens 2-5 may be programmed by the owner/operator to display any desired message, such as a feature of the week, new films available, and so on. If a customer wishes to make a purchase or rental from the machine, he inserts his card into card reader 18. CPU 38 will then execute a card verification routine to determine whether the inserted card is a customer's card or an operator's card. If a customer's card, CPU will also determine whether the inserted card is one that is accepted by the owner and is not a card excluded for a reason such as an overdue account, exceeding the maximum number of open rentals, or the like. While this routine is being carried out, CPU 38 causes CRT 24 to display an appropriate message, such as "VERIFYING YOUR CREDIT CARD-PLEASE WAIT".

If the credit card is unacceptable for any reason, CPU 38 exits the main program loop and returns to the sequential display of the various screens on CRT 24. If the card inserted into card reader 18 is the operator's access card, CPU 38 exits the main program loop and enters subloop B. In this subloop, the operator can instruct CPU 38 to prepare the various reports such as lost sales, sold videocassettes, videocassettes out, and the like; carry out billing functions; execute data base management functions whereby the data bases discussed above may be reprogrammed; carry out debugging routines; accept the addition of videocassettes to be stored in the machine; dispense videocassette to be removed from the machine; and so forth. At any time in subloop B, the operator may cancel, and return to point A in the main program loop.

If the credit card inserted in credit card reader 18 is a customer credit card, CPU 38 will prompt the customer to select the desired transaction, e.g., purchase, rent or return videocassettes. CRT 24 may display a message such as

---

"PLEASE PRESS:
PURCHASE
RENT
RETURN
CANCEL"

---

If the customer choses to cancel his transaction, CPU 38 exits the loop and returns to the sequential screen display. If the customer chooses to purchase or rent a videocassette, he presses the appropriate mode selection pushbutton 20. CPU 38 will then prompt the customer to chose the type of videocassette to be dispensed, e.g., VHS, Beta or other. For example, CRT may display a message such as "PRESS 1 for VHS—PRESS 2 for Beta".

After the customer selects the type of videocassette, the CPU 38 prompts the customer to enter the selection number of the desired videocassette by means of keypad 22. CRT 24 may display a message such as "PLEASE ENTER YOUR SELECTION NUMBER". After the selection number is entered, CPU 38 consults the videocassette inventory data base to determine whether the desired selection is available for purchase or rental. If it is not, CPU 38 may display an appropriate message and prompt the customer to make an alternate selection. At this point, the customer can cancel the transaction by pressing the appropriate mode select push-button.

If the desired videocassette is in stock, CPU 38 displays a message such as "YOUR SELECTION IS IN STOCK. THIS IS YOUR LAST OPPORTUNITY TO CANCEL THE TRANSACTION. PRESS PUR- CHASE [or RENT, as appropriate for the desired transaction] TO CONFIRM THE TRANSACTION. PRESS CANCEL TO CANCEL THE TRANSACTION."

At this point in the main loop of the program, CPU 38 obtains the authorization to charge the transaction to the customer's credit card account by communicating with the credit card company by means of modem 36. This can be done automatically by linking videocassette vending machine 10 to the host processor of the credit card company.

Once authorization is obtained, the transport means 100 is actuated under control of CPU 38. CPU 38 obtains from the videocassette inventory table the ($\theta$, z) coordinates of the videocassette selected. The picker mechanism 148 at this point will be in the home position. CPU 38 then calculates the number of shaft encoder pulses from motors 132 and 138 required to move picker mechanism 138 from its home position to the ($\theta$, z) coordinates of the selected videocassette. Motors 132 and 138 are then energized in the "fast" mode and picker mechanism 148 is moved in the z and $\theta$ directions at high speed toward the ($\theta$, z) coordinates of the selected videocassette. When the picker mechanism 148 is within a predetermined number of shaft encoder pulses of its final ($\theta$, z) coordinate destination, the motors 132 and 138 are energized at the "slow" speed until the pulses from the shaft encoders indicate that the picker mechanism has reached the ($\theta$, z) coordinate destination.

When picker mechanism 148 reaches this location, motor 180 is energized to extend picker mechanism 148 from its retracted position to its fully-extended position, as shown in FIG. 5. When picker mechanism 148 reaches its fully extended position, as indicated by closure of switch 184, and when the presence of a videocassette between picker fingers 166 and 168 is indicated by closure of switch 206, solenoid 190 is energized, thereby closing fingers 166 and 168. When fingers 166 and 168 are closed, as indicated by the opening of switch 196, picker assembly 148 is retracted to its fully-retracted position, and motors 132 and 138 are energized to cause transport 100 to convey the selected videocassette to the ($\theta$, z) coordinates of the customer access door 28.

When the shaft encoders associated with motors 132 and 138 indicate that the picker mechanism has reached the customer access door 28, picker mechanism 148 is again extended to its fully-extended position, thereby placing the selected videocassette in cavity 218 customer-access door 28. Latch 198 is released, finger 168 drops and the videocassette is released by picker mechanism 148.

When the videocassette is fully seated in customer access door 28, as indicated by closure of a switch (not shown in the drawings), picker assembly 148 is retracted and is returned to its home position. Simultaneously, the locking solenoid for access door 28 is unlatched, and access door 28 is free to pivot outwardly to dispense the desired cassette to the customer. Also simultaneously, a rental receipt is printed by printer 26.

After the purchase or rental transaction is completed, CPU 38 returns to point A in the main program loop and is available for another transaction. If no further transaction is desired, the customer simply presses "CANCEL", and CPU 38 returns to the sequential display of the various screens. If the customer desired to purchase or rent an additional videocassette or videocassettes, the above-described sequence is repeated. The above-described sequence can be repeated as often as desired up to a predetermined maximum number of times set by the owner/operator.

To return videocassettes, the customer inserts his credit card as described above, and, after his card is verified, presses the "RETURN" mode selection push button. When the return mode is selected, CPU 38 goes to subloop C of the program, and displays an appropriate message to the customer, such as:

"TO RETURN A VIDEOCASSETTE
1. PLACE VIDEOCASSETTE AS SHOWN IN RETURN BIN
2. PRESS RETURN BUTTON AGAIN"

At that point, a message is displayed asking the customer to press a key indicating if the videocassette is in good condition or may have been damaged during rental. If the customer indicates a problem with the returned videocassette, the inventory data base is updated and the videocassette is flagged to prevent further rental.

When the customer inserts the videocassette in the customer access door 28 and closes the door, the returned videocassette is scanned by scanner 30 and the videocassette is identified. CPU 38 then obtains from memory the original rental record corresponding to the returned videocassette. The rental charges for the videocassette are calculated and charged to the customer's credit card account.

Simultaneously, CPU 38 consults the inventory table to locate the empty available storage location in the storage means closest to the home position of picker assembly 148. The closest available storage position is chosen to minimize transport means cycle time. Picker assembly 148 is then moved to customer access door 28 where it grips the returned videocassette, and is then moved to the ($\theta$, z) coordinates of the available storage location, where it inserts the returned videocassette. After inserting the returned videocassette, picker mechanism 148 returns to the home position. Simultaneously, the inventory table and other records are updated to reflect return of the videocassette. Finally, a receipt is printed for the customer. CPU 38 then returns to point A in the main program loop, where the machine is available for additional transactions. If no further transactions, such as further returns or rentals, are to be carried out, the operator presses CANCEL, and CPU 38 returns to the sequential display of the various screens.

If a videocassette being returned is not acceptable for any reason (e.g., the CPU 38 has no record of the videocassette or the videocassette was not rented from the machine), the videocassette is placed in a storage location and a message and/or printed coupon is generated, advising the customer that the tape is not acceptable, and providing a telephone number for the customer to call for service. The storage location is also flagged in the machine inventory data base to prevent the unacceptable tape from being vended or rented.

In addition to the ability of placing returned videocassettes to any available empty storage location in the storage means 40, videocassette vending machine 10 has the ability to stock itself. This enables an owner/operator or his clerk to simply insert videocassettes to be stored into videocassette vending machine 10 via customer access door 28. Videocassette vending machine 10 will automatically scan the videocassettes and note which videocassettes are inserted, and will place them in available empty storage locations and store those locations in memory. This means that the owner/operator does not need to enter the identity of the videocassette and its storage location individually into memory unit 34.

When a videocassette to be stored is inserted into the machine via customer access door 28, it is scanned by scanner 30, and the identity of the videocassette is stored in memory. Videocassette transport means 100 then transports the videocassette from the customer access door to the available empty storage location closest to its "home" position. The ($\theta$, z) coordinates of this storage location are then stored in memory along with the identification of the cassette. This process is repeated for each cassette to be stored in the machine. Thus, all the owner/operator need do to store videocassettes is insert them into the machine. This minimizes the chance of operator error in manually entering videocassette identification information and storage location in the inventory data base.

It will be appreciated that the design of the transport means and storage means and the software-controlled operation of the machine (e.g., the ability of the machine to place a returned cassette to any available storage location) enable the machine to operate at much lower cycle times than prior machines. This not only saves the customer's time but maximizes machine throughput and, hence, revenues generated by the machine. It will also be appreciated that the design of transport means 100 provides for greatly simplified assembly, maintenance and repair, all of which enable the machine to be made and operated at lower cost than prior machines.

The present invention may be embodied in other specific forms without departing from the spirit or essential attributes thereof and, accordingly, reference should be made to the foregoing specification, as indicating the scope of the invention.

What is claimed is:

1. Apparatus for selectably vending or renting articles to a customer, comprising:
    article storage means for storing a plurality of articles in discrete, identifiable locations,
    mode selection means for enabling the customer to select among a vend mode, a rent mode and a return mode,
    article selection means for enabling the customer to select a desired article to be vended or rented,
    customer access means for dispensing the selected article to the customer in the vend and rent modes and receiving the article from the customer in the return mode,
    article identification means for receiving information representative of the identity of the article being returned in the return mode,
    article transport means for transporting the selected article from the storage means to the customer access means in the vend and rent modes and transporting the article from the customer access means in the return mode to an available empty discrete location in the storage means closest to said transport means, and
    memory means for storing information about the coordinates of stored articles and available empty discrete locations in the storage means.

2. Apparatus according to claim 1, further including customer identification means for receiving information about the customer, and
    control means coupled to the customer identification means, the mode selection means, the article selection means, the article identification means, the article transport means, and the memory means for receiving information about the customer and the selected article, causing said information to be stored in the memory means, causing the article transport means to transport the selected article from the storage means to the customer access means and causing the information in the memory means representative of the locations of articles in the storage means to be altered to indicate removal of the selected article from its location in the storage means, all when in the vend or rent modes, and for receiving information about the customer and the returned article, causing said information to be stored in the memory means, causing the article transport means to transport the returned article from the customer access means to the storage means and causing information in the memory means representative of the locations of articles in the storage means to be altered to indicate the placement of the returned article, all when in the return mode.

3. Apparatus according to claim 1, further comprising means for automatically placing articles to be stored in the storage means and for automatically storing in the memory means information representative of the stored article and its corresponding location in the storage means.

4. Apparatus according to claim 1, further comprising means for causing the transport means to automatically generate calibrating signals representative of movement of the transport means in two coordinates and for automatically storing the calibration signals in the memory means.

5. Apparatus according to claim 1, further comprising modem means for communicating between the apparatus and a host processor.

6. Apparatus according to claim 1, further comprising means for selectably programming the control means to perform operator-definable functions.

7. Apparatus according to claim 1, further comprising means associated with said article for uniquely keying the article to the apparatus in the return mode.

8. Apparatus according to claim 7, further comprising means operatively associated with the customer access means for mating with the means for keying for permitting operation of the customer access means only when the means for keying mates with the customer access means.

9. Apparatus according to claim 1, wherein the article storage means comprises a plurality of individual storage locations, each definable by cylindrical coordinates.

10. Apparatus according to claim 1, wherein the customer identification means comprises a credit card reader.

11. Apparatus according to claim 1, wherein the mode selection means comprises a plurality of customer-actuatable pushbuttons.

12. Apparatus according to claim 1, wherein the article selection means comprises a numeric keypad.

13. Apparatus according to claim 1, wherein the article identification means comprises an optical scanner.

14. Apparatus according to claim 13, wherein the optical scanner comprises a bar code reader.

15. Apparatus according to claim 1, wherein the memory means comprises a magnetic storage medium.

16. Apparatus according to claim 1, wherein the magnetic storage medium comprises a floppy disk.

17. Apparatus according to claim 1, wherein the article transport means comprises first means pivotable about an axis, second means pivotable with said first means and linearly movable along the axis, and third means linearly movable along the axis with the second means for reciprocal movement toward and away from the axis.

18. Apparatus according to claim 17, further comprising means for moving the first means, second means and third means to any of a plurality of locations definable by cylindrical coordinates.

19. Apparatus according to claim 1, wherein the control means comprises a microcomputer.

20. Apparatus according to claim 1, further comprising means for accepting cash from the customer.

21. Apparatus according to claim 20, further comprising means for enabling the customer to choose between a cash mode of operation and credit mode of operation.

22. Apparatus according to claim 1, wherein the customer access means comprises means thereon for preventing insertion of objects other than articles into the interior of the apparatus.

23. Apparatus according to claim 1, further comprising means for receiving information representative of the condition of an article being returned in the return mode, and means operatively associated with the first-mentioned means for preventing subsequent rental of an article not in condition to be rented.

24. Apparatus according to claim 1, including means operatively associated with the article identification means in the return mode for causing articles unacceptable for return to be placed in a discrete location in the storage means and for causing the coordinates of that discrete location to be entered into the memory means along with information identifying that discrete location as containing an article not available for further vending or renting.

25. Apparatus according to claim 1, wherein the customer access means comprises means pivotably movable between open and closed positions and having article receiving means being in radial alignment with the transport means when in the closed position and being manually accessible by a customer when in the open position.

26. Apparatus according to claim 25, further comprising locking means associated with the customer access means for permitting movement of the customer access means between the closed and opened positions only when an article is to be dispensed to a customer in the vend or rent mode or received from a customer in the return mode.

27. Apparatus according to claim 1, wherein the storage means comprises a portion of the surface of a right cylinder, the storage means having a plurality of radially-spaced dividing walls extending parallel to the axis of the cylinder, the dividing walls having means for receiving therein a plurality of axially-spaced shelves arranged to lie substantially in axially-spaced planes perpendicular to the axis of the cylinder, the walls and shelves defining discrete, identifiable storage locations therebetween.

28. Apparatus according to claim 27, wherein the walls are provided with resilient means for releaseably retaining articles in the storage locations.

29. Apparatus according to claim 28, wherein the resilient means are formed integral with the walls.

30. Article storage and transport means comprising:
a storage means comprising a portion of the surface of a right cylinder, the storage means having a plurality of radially-spaced dividing walls extending parallel to the axis of the cylinder, the dividing walls having means for receiving therein a plurality of axially-spaced shelves arranged to lie substantially in axially-spaced planes perpendicular to the axis of the cylinder, the walls and shelves defining discrete, identifiable storage locations therebetween, each storage location being definable by cylindrical coordinates,
article transport means coaxial with the axis of the cylinder, said transport means including first means pivotable about the axis, second means pivotable with said first means and linearly movable along the axis, and third means linearly movable along the axis with the second means for reciprocal movement toward and away from the axis along a radial direction, said transport means having a home position to which it return after operation thereof, said article transport means having means for moving the first means, second means and third means to any of a plurality of locations definable by cylindrical coordinates, and
means in operative association with said transport means for transporting an article to an available discrete, identifiable storage location in said storage means closest to the home position of said transport means.

31. Apparatus for selectively vending or renting articles to a customer, comprising:
a cabinet,
article storage means in the cabinet for storing a plurality of articles in discrete identifiable locations, each individual storage location being definable by cylindrical coordinates,
customer identification means for receiving information about the customer,
mode selection means for enabling the customer to select among a vend mode, a rend mode, and a return mode,
article selection means for enabling the customer to select a desired article to be vended or rented,
customer access means in the cabinet for dispensing the selected article to the customer in the vend and rent modes and receiving the article from the customer in the return mode,
article identification means adjacent the customer access means for receiving information representative of the identity of the article from the customer in the return mode,
article identification means adjacent the customer access means for receiving information representative of the identity of the article being returned in the return mode,
article transport means for transporting the selected article from the storage means to the customer access means in the vend and rent modes and transporting the article from the customer access means to an available empty discrete location in the storage means in the return mode, the article transport means having first means pivotable about an axis, second means pivotable with said first means and linearly moveable along the axis, and third means linearly moveably along the axis with the second means for reciprocal movement toward and away from the axis, and having means for moving the first means, second means and third means to any of a plurality of locations defined by cylindrical coordinates, memory means for storing information about the customer, the selected article, and the coordinates of articles and available empty discrete locations in the storage means, information receiving means for receiving information representative of the condition of an article being returned in the return mode, and means operatively associated with said information receiving means for preventing subsequent rental of an article not in condition to be rented.

32. Apparatus according to claim 31, further comprising means for causing the transport means to automatically generate calibrating signals representative of movement of the transport means in two coordinates and for automatically storing the calibration signals in the memory means.

33. Apparatus according to claim 31, further comprising modem means for communicating between the apparatus and a host processor.

34. Apparatus according to claim 31, further comprising means for selectively programming the control means to perform operator-defineable functions.

35. Apparatus according to claim 31, further comprising means associated with said article for uniquely keying the article to the apparatus in the return mode and means operatively associated with the customer access means for mating with the means for keying for permitting operation of the customer access means only when the means for keying mates with the customer access means.

36. Apparatus according to claim 31, wherein the customer identification means comprises a credit card reader.

37. Apparatus according to claim 31, wherein the mode selection means comprises a plurality of customer-actuatable pushbuttons.

38. Apparatus according to claim 31, wherein the article selection means comprises a numeric key pad.

39. Apparatus according to claim 31, wherein the article identification means comprises an optical bar code reader.

40. Apparatus according to claim 31, wherein the memory means comprises a floppy disk.

41. Apparatus according to claim 31, including means operatively associated with the article identification means in the return mode for causing articles unacceptable for return to be placed in a discrete location in the storage means and for causing the coordinates of that discrete location to be entered into the memory means along with information identifying that discrete location as containing an article not available for further vending or rental.

42. Method of automatically selectably vending or renting articles to a customer, comprising the steps of:

storing a plurality of articles in discrete, identifiable locations in a storage means, enabling the customer to select among a vend mode, a rent mode and a return mode, enabling the customer to select a desired article to be vended or rented, dispensing the selected article to the customer in the vend and rent modes and receiving the article from the customer in the return mode, receiving information representative of the identity of the article being returned in the return mode, automatically transporting the selected article by a transport assembly from a storage location to a customer access means for dispensing the selected article in the vend and rent modes and automatically transporting the article in the return mode from the customer access means to an available empty storage location closest to said transport assembly, and storing information about the customer, the selected mode, the selected article, and the coordinates of article and available empty discrete locations in the storage means in a memory for later retrieval and processing.

43. Apparatus for selectably vending or renting articles to a customer, comprising:

article storage means for storing a plurality of articles in discrete, identifiable locations, mode selection means for enabling the customer to select among a vent mode, a rent mode and a return mode, article selection means for enabling the customer to select a desired article to be vended or rented, customer access means for dispensing the selected article to the customer in the vend and rent modes and receiving the article from the customer in the return mode, article identification means for receiving information representative of the identity of the article being returned in the return mode, article transport means for transporting the selected article from the storage means to the customer access means in the vend and rent modes and transporting the article from the customer access means to any available empty discrete location in the storage means in the return mode, memory means for storing information about the coordinates of stored articles and available empty discrete locations in the storage means, information receiving means for receiving information representative of the condition of an article being returned in the return mode, and means operatively associated with said information receiving means for preventing subsequent rental of an article not in condition to be rented.

44. Apparatus for selectably vending or renting articles to a customer, comprising:

article storage means for storing a plurality of articles in discrete, identifiable locations, mode selection means for enabling the customer to select among a vend mode, a rent mode and a return mode, article selection means for enabling the customer to select a desired article to be vended or rented, customer access means for dispensing the selected article to the customer in the vend and rent modes and receiving the article from the customer in the return mode, article identification means for receiving information representative of the identity of the article being returned in the return mode, article transport means for transporting the selected article from the storage means to the customer access means in the vend and rent modes and transporting the article from the customer access means to any available empty discrete location in the storage means in the return mode, memory means for storing information about the coordinates of stored articles and available empty discrete locations in the storage means, and means operatively associated with the article identification means in the return mode for causing articles unacceptable for return to be placed in a discrete location in the storage means and for causing the coordinates of the discrete location to be entered into the memory means along with information identifying that discrete location as containing an article not available for further vending or rental.

45. Apparatus for selectable vending or renting articles to a customer, comprising:

article storage means for storing a plurality of articles in discrete, identifiable locations, mode selection means for enabling the customer to select among a vend mode, a rent mode and a return mode, article selection means for enabling the customer to select a desired article to be vended or rented, customer access means for dispensing the selected article to the customer in the vend and rent modes and receiving the article from the customer in the return mode, article identification means for receiving information representative of the identity of the article being returned in the return mode, article transport means for transporting the selected article from the storage means to the customer access means in the vend and rent modes and transporting the article from the customer access means to any available empty discrete location in the storage means in the return mode, memory mean for storing information about the coordinates of stored articles and available empty discrete locations in the storage means, keying means associated with said article for uniquely physically keying the article to the apparatus in the return mode, and means operatively associated with the customer access means for physically mating with said keying means for permitting operation of the customer access means only when said keying means mates with the customer access means.

46. Apparatus for selectively vending or renting articles to a customer, comprising:

a cabinet, article storage means in the cabinet for storing a plurality of articles in discrete identifiable locations, each individual storage location being definable by cylindrical coordinates, customer identification means for receiving information about the customer, mode selection means for enabling the customer to select among a vend mode, a rent mode, and a return mode, article selection means for enabling the customer to select a desired article to be vended or rented, customer access means in the cabinet for dispensing the selected article to the customer in the vend and rent modes and receiving the article from the customer in the return mode, article identification means adjacent the customer access means for receiving information representative of the identity of the article being returned in the return mode, article transport means for transporting the selected article from the storage means to the customer access means in the vend and rent modes and transporting the article from the customer access means to an available empty discrete location in the storage means in the return mode, the article transport means having first means pivotable about an axis, second means pivotable with said first means and linearly moveable along the axis, and third means linearly moveable along the axis with the second means for reciprocal movement toward and away from the axis, and having means for moving the first means, second means and third means to any of a plurality of locations defined by cylindrical coordinates, memory means for storing information about the customer, the selected article, and the coordinates of articles and available empty discrete locations in the storage means, and means operatively associated with the article identification means in the return mode for causing articles unacceptable for return to be placed in a discrete location in the storage means and for causing the coordinates of that discrete location to be enter into the memory means along with information identifying that discrete location as containing an article not available for further vending or rental.

47. Apparatus according to claim 31, further including control means coupled to the customer identification means, the mode selection means, the article selection means, the article identification means, the article transport means, and the memory means for receiving information about the customer and the selected article, causing said information to be stored in the memory means, causing the article transport means to transport the selected article from the storage means to the customer access means and causing the information in the memory means representative of the locations of the articles in the storage means to be altered to indicate removal of the selected article from its location in the storage means, all when in the vend or rent mode, and for receiving information about the customer and the returned article, causing said information to be stored in the memory means, causing the article transport means to transport the returned article from the customer access means to any available memory location in the storage means and causing information in the memory means representative of the locations of articles in the storage means to be altered to indicate the placement of the returned article in the available empty location, all within the return mode.

48. Apparatus according to claim 31, further including means for automatically placing articles to be stored in an available empty location in the storage means closest said transport means and for automatically storing in the memory means information representative of the stored article and its corresponding location in the storage means.

49. Apparatus according to claim 1, wherein said transport means includes an assembly for releasably engaging articles when in said article storage means and said customer access means, said assembly having a home position to which it returns after operation of said transport means, said transport means transporting the article from the customer access means in the return mode to an available empty discrete location in the storage means closest to said home position of said assembly.

50. Apparatus according to claim 49, wherein the position of said transport means is adjacent said customer access means.

51. Method according to claim 42, wherein said transport assembly has a home position to which it returns after operation thereof, and wherein the transporting of the article from the customer access means in the return mode is to an available empty discrete location in the storage means closest to said home position of said transport assembly.

52. Method according to claim 51, wherein the position of said transport means adjacent said customer access means.

53. Apparatus according to claim 1, wherein said article comprises a videocassette.

54. Apparatus according to claim 31, wherein said article comprises a video cassette.

55. Apparatus according to claim 43, wherein said article comprises a videocassette.

56. Apparatus according to claim 44, wherein said article comprises a videocassette.

57. Apparatus according to claim 45, wherein said article comprises a videocassette.

58. Apparatus according to claim 46, wherein said article comprises a videocassette.

59. Method according to claim 42, wherein said article comprises a videocassette.

60. Article storage and transport means according to claim 30, wherein said article comprises a videocassette.

* * * * *

UNITED STATES PATENT AND TRADEMARK OFFICE
CERTIFICATE OF CORRECTION

PATENT NO. : 4,814,592

DATED : March 21, 1989

INVENTOR(S) : Bradt et al.

It is certified that error appears in the above-identified patent and that said Letters Patent is hereby corrected as shown below:

```
Column 11, line 55, "88" should read --188--.
Column 11, line 68, "66" should read --166--.
Column 12, lines 12 and 13, "68" should read --168--.
Column 12, lines 14 and 17, "98" should read --198--.
Column 12, line 38, the second "z max," should read --z max),--.
Column 12, line 40, "14B" should read --148--.
Column 20, line 21, "return" should read --returns--.
Column 20, line 41, "rend" should read --rent--.
Column 20, please delete lines 49 thru 52.
Column 22, line 20, "vent" should read --vend--.
Column 23, line 12, "selectable" should read --selectably--
Column 23, line 34, "mean" should read --means--.
Column 24, line 23, "enter" should read --entered--.
Column 25, line 12, between "means adjacent" insert --is--.
```

Signed and Sealed this

Twelfth Day of December, 1989

Attest:

JEFFREY M. SAMUELS

*Attesting Officer*   Acting Commissioner of Patents and Trademarks